United States Patent Office 3,454,781
Patented July 8, 1969

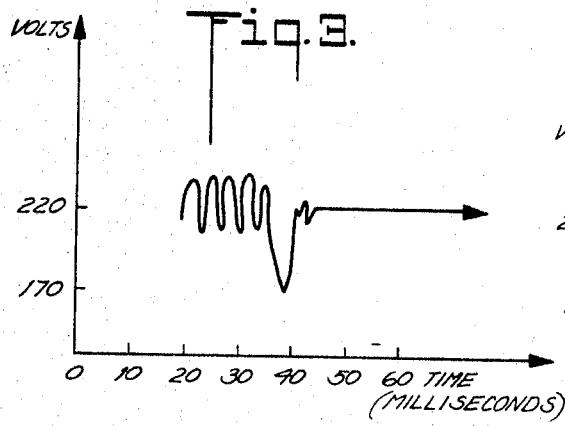
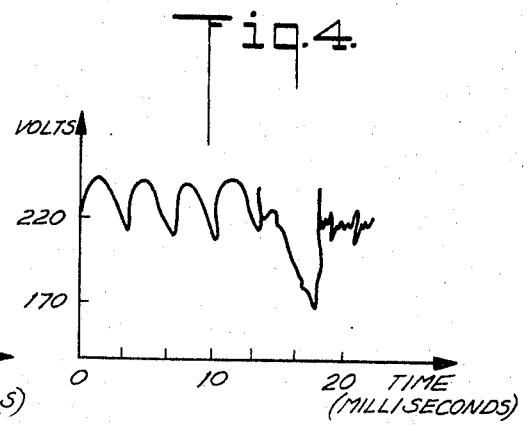
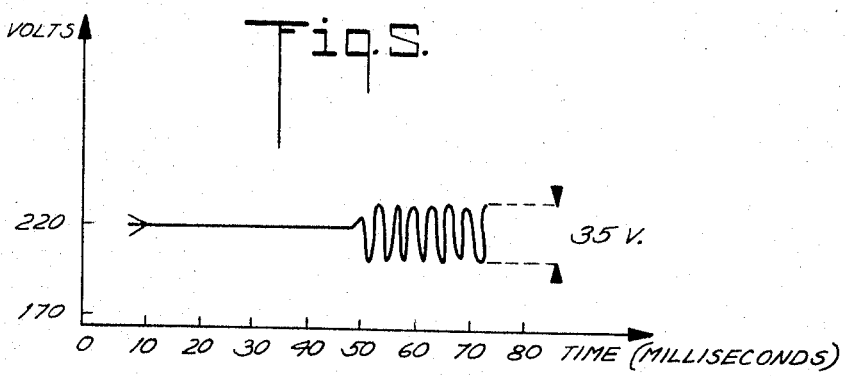
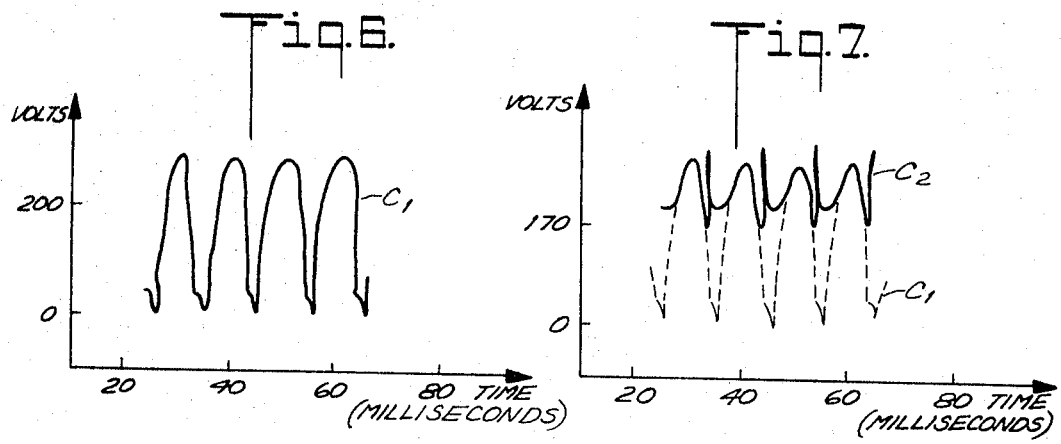

3,454,781
SUPER-FAST SWITCHING DEVICE, USING EITHER DIRECT OR RECTIFIED ALTERNATING CURRENT, MORE PARTICULARLY APPLIED FOR SUBSTITUTING ONE POWER SOURCE TO ANOTHER
Jean-Pierre Alphonse Scholler, Clichy-sous-Bois, France, assignor to Societe des Accumulateurs Fixes et de Traction (Societe Anonyme), Romainville, France, a company of France
Filed Dec. 27, 1966, Ser. No. 604,782
Claims priority, application France, Dec. 29, 1965, 44,201
Int. Cl. H02j 9/06
U.S. Cl. 307—66                                       14 Claims

ABSTRACT OF THE DISCLOSURE

The disclosure herein relates to a super-fast switching arrangement and circuits to provide continuous direct current supply to a load apparatus from a main power source or from an emergency power source in the event of main power failure or voltage drop below a prescribed level. The circuit includes as a switching device a thyrator preferably in the form of a thyristor which operates in milliseconds upon main power failure or reduced voltage to connect the emergency power source to supply the load apparatus effectively from the emergency power source, protective means being provided to prevent overload of the thyrator or thyristor and to turn it off or cut it off after transition from the main power source to the emergency power source and vice versa. Other protective means to limit current through the thyrator or thyristor in the event of short circuit conditions in the load apparatus are also provided. Means, too, are provided to charge the emergency power source as long as the main power circuit is operative and to prevent its discharge into the main power lines upon occurrence of main power failure.

BRIEF SUMMARY OF THE INVENTION

This invention relates to super-fast switching devices utilizing either direct or rectified alternating current for switching from a primary power source to another in the event of failure of the primary source.

Many apparatuses, more particularly those using direct or rectified current for their operation, either for reasons of safety or for other reasons require a continuous current supply, even when their normal power supply fails. This means that they require an instantaneous supply by an emergency power source in substitution for the failing main power source.

Examples of such apparatuses may be lifting, manipulating or handling electro-magnets, magnetic plates of machining tools, sequential control devices for electroplating apparatus, weaving apparatus and the like.

The continuity of supply in such cases usually should be such that no substantial voltage drop or a fortiori no interruption in the supply will occur even during as short an interval of time as a few milliseconds. On the other hand, it is advantageous that as soon as the main power source is restored the emergency source be almost immediately cut off to prevent any unnecessary discharging of it.

Usually, the emergency power source provided to palliate the failure of a main power source is composed of a storage battery connected to the apparatuses to be powered as by means of a fast acting electromagnetic relay or switch, e.g. actuated by lack of voltage, normally energized by the main power source.

The response time of such magnetic relays is generally about a few dozens of milliseconds, but because of mechanical limitations, cannot be less than 10 milliseconds. In such conditions, when a main power source fails, the electromagnetic relay contactor has the emergency power source supply the load after an interval of about a few dozens of milliseconds, thus then palliating the failure of the main source. However, the limited response time of such electromagnetic switching devices is too long for some of the apparatuses as have been mentioned above.

Lately, the use has been suggested of a super-fast switching device for supplying direct current by the means of an emergency power source, more particularly composed of a storage battery, in the case of failure of the main power source delivering either a direct or rectified current to a load.

Such a device which has been described in the French patent application 18,162 filed May 24, 1965 by applicant's assignee, Societe des Accumulateurs Fixes et de Traction, under the title: "Dispositif de commutation ultra-rapide pour l'alimentation en courant continu d'un circuit de secours et installations électriques équipées d'un tel dispositif" (Super-fast switching device for supplying an electrical emergency circuit with a direct current, and electrical apparatuses fitted with such devices) comprises a static switching unit connected in series in an emergency circuit and having a very short response time, such as a rectifier unit with a controlled conductivity, thyrator or thyristor, for example, actuated when the main circuits fails. This switching device is setup so that it substitutes for the current supply from the main power source a supply from an emergency circuit by reversing the current through a resistor causing the thyristor to become conductive when the main circuit voltage drops below a very low value, usually lower than half the normal supply voltage.

The present invention also relates to an super-fast switching device of this type, but provides for the substitution of an emergency power circuit for a main power circuit at the terminals of a load as soon as the voltage at the terminals of the main power circuit falls below a predetermined value, which latter is as close as is required to a value which is substantially the normal voltage delivered by the main plant power circuit. The switching device is static and preferably an electronic rectifier unit such as a thyrator or thyristor. Moreover, the switching device according to the present invention permits return to the original supply means and the cut-off instantaneously of the emergency source as soon as the main power source is again able to deliver its normal operating voltage to the load.

The super-fast switching device, according to the present invention, is especially notable in that the potential of the control electrode or gate of the rectifier unit, thyrator or thyristor used with it, cannot drop below a value which is imposed by the setting of the emergency circuit and which is kept in memory while the cathode of the said rectifier unit is maintained at a voltage delivered by the main circuit.

According to another feature of the invention, the anode of the rectifier unit, thyrator or thyristor, is connected to the positive terminal of the emergency circuit, the cathode is connected to the input of the load circuit, the output of which is connected to the negative terminal of the emergency circuit and the control electrode or gate is connected to the sliding contact of a potentiometer connected across the terminals of the emergency circuit.

According to still another feature of the invention, a rectifier preferably a diode or possibly a transistor, is inserted between the said control electrode and the sliding contact of the potentiometer, allowing the one-way passage of the current only in the direction of the slide-controlled electrode.

It is thus clear that a minimum bias voltage of the control electrode of the thyrator, thyristor or similar device can be set and kept in memory as long as the voltage of the main power source applied to the cathode has not dropped below a value slightly under the preset memory voltage value. In other words, as long as the potential of the thyrator or thyristor cathode remains situated between the normal potential of the positive terminal of the main circuit and a lower minimum value, previously selected (according to the supply circuit requirements) the potential of the thyrator or thyristor control electrode must remain lower or substantially equal to the cathode potential of the controlled conduction unit, thus preventing the turning on of the said unit. The minimum output potential at the positive terminal of the main circuit, which actuates the release of the thyrator of thyristor obviously depends on the position of the said sliding contact of the potentiometer and also on the characteristics of the thyrator or thyristor used.

With such an assembly, it is easy to understand that, when the normal main circuit voltage is restored, the thyrator or thyristor will again be turned off unless the emergency plant voltage exceeds the voltage normally delivered by the other circuit. In such a case, an additional device may be necessary to de-energize the controlled conduction unit.

According to another aspect and feature of the present invention, the controlled conduction unit, thyrator or thyristor or similar device, is parallel connected to an electromagnetically operated contactor or the like which normally connects the emergency circuit above mentioned when the main circuit fails and which then shunts the said unit which is then turned off. The contactor is, for example, of a minimum voltage type which is in circuit closed condition when the voltage at the main circuit terminals falls below a given value. This magnetic contactor has a response time of a few dozens of milliseconds. It permits the use of a lower powered thyristor or similar device, reducing thus the cost of the apparatus. As is known, a thyristor can withstand overcurrents of from 5 to 10 times its normal operating value for a few dozens of milliseconds. Therefore, the more the response time of the magnetic contactor is reduced, the more the thyristor power can be reduced since the said thyristor functions to insure the supply of the load only during the time required by the contactor to operate and is then immediately cut-off again because its maintaining current is not high enough to keep it in operation because of the short circuit effected by the closing of the magnetic contactor bridging circuit.

It must be noted that when the normal voltage is restored at the main circuit terminals, the magnetic contactor is again energized to circuit open condition and thus cuts off the supply to the load circuit from the emergency circuit terminals. Since meanwhile the control electrode and the cathode of the thyrator or thyristor have both been biased by the voltage delivered by the main circuit, the thyrator or thyristor or its equivalent will remain turned off and the emergency source will thus normally be and remain cut-off.

In order to describe the principles of the present invention in as simple a manner as possible, the drop of voltage in the controlled conduction units when they are turned on has not been taken into account as it would only cause small differences.

Other objects and features of the invention will become apparent from the following description of some embodiments given solely as examples, together with the annexed drawings, wherein:

FIGURES 3, 4, 5, 6 and 7 are plotted curves of voltage vs. time, illustrating the operation of the switching of the main circuit to the emergency circuit or reversely, according to the present invention.

DETAILED DESCRIPTION

Figure 1:
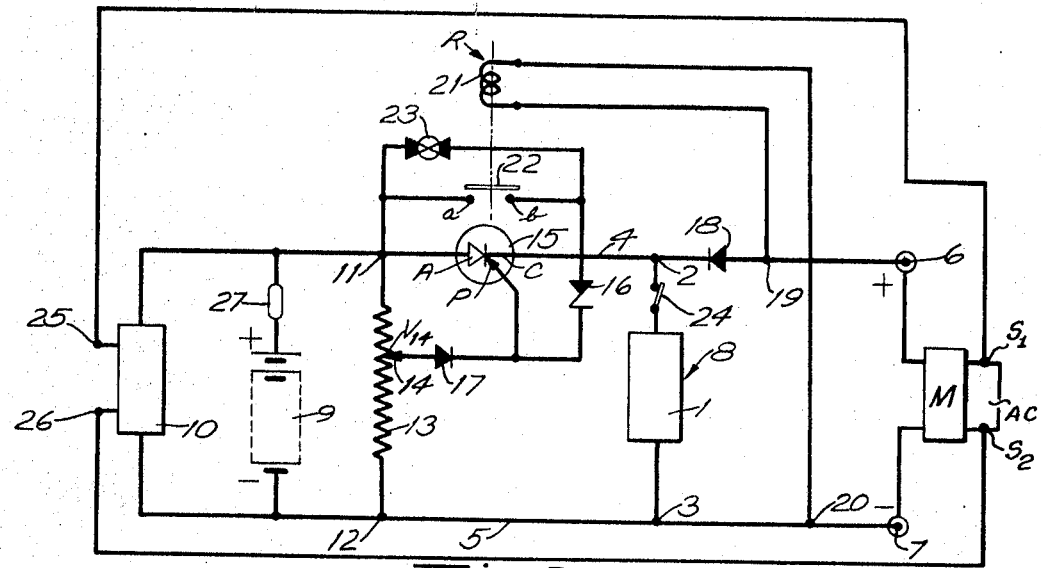
FIGURE 1 is an electrical diagram of a fast-switching device embodying the present invention.

Referring to the drawings and first to FIGURE 1, the embodiment shown therein includes an apparatus 1, required to be supplied, as connected into a load circuit 8, terminals 2 and 3 of which are connected to the leads 4 and 5, the latter are connected to the main source terminals 6 and 7, these being connected to AC power supply terminals $S_1$, $S_2$ through a rectifier and stabilizer device M which is used normally to deliver a normal operating voltage to the load circuit 8. The respective positive and negative terminals of an emergency battery 9 are also connected to the leads 4 and 5. The rated voltage at the battery terminals is usually substantially equal to the voltage normally delivered between the terminals 6 and 7 of the main supply source. The battery 9 is maintained in a charged state as by a charging circuit 10 of conventional type when the main source supplies a normal current at its terminals 6 and 7.

A potentiometer resistor 13 of high resistance value is connected between the points 11 and 12 of leads 4 and 5. A potentiometer slide 14 is movable along resistor 13. The voltage $V_{14}$ appearing at the contact of slide 14 on the resistor 13 is kept in memory or is applied to the control electrode or gate P of a controlled conduction rectifier unit 15, which is, for example, a thyrator, which latter is preferably a thyristor. The voltage $V_{14}$ is obviously a fraction of the voltage across the terminals of battery 9, the value of this fraction depending on the position of the slide 14 on the resistor 13. The anode A of the thyristor 15 is at the voltage of the positive terminal of the battery, whereas the cathode C of the thyristor 15 is at the voltage of the positive terminal 6 of the main plant.

As long as the voltage $V_p$ of its gate P is lower than the voltage $V_c$ at its cathode C, the thyristor 15 is turned off and no current can pass in any direction. On the contrary, when the voltage $V_p$ at the gate P is sufficiently higher than the voltage $V_c$ applied to the cathode C, the thyristor 15 becomes conductive and the current can freely flow through the thyristor 15 from the anode A to the cathode C. Usually, the potential difference $V_p - C_c$ at which the thyristor 15 becomes conductive is approximately a few volts and more often than not is lower than 3 volts. Since the response time of the thyristor 15 is in the order of a few microseconds, it is clear that the position of the slide 14 on the potentiometer resistor 13, and thus the minimum value of the voltage $V_p$ of the gate P, can be selected so as to control the turning on of thyristor 15 as soon as the voltage $V_6$ of the positive terminal of the main source drops below a predetermined value which is chosen as being a few volts. Gate P may be termed a control electrode of thyristor 15.

A Zener diode is shown at 16 which is connected to bridge cathode C and gate P and is intended to prevent any breakdown of the thyristor 15 if the potential difference $V_p - V_c$ should happen to rise too high, i.e. over ten volts, for example.

A rectifier unit such as a diode, is shown at 17 which is connected between the gate P and slide 14 and is intended to prevent the current coming from the terminal 6 from passing through the resistor 13 of the potentiometer via said slide 14 and lead 5 to the negative terminal 7.

Another rectifier unit such as a diode, is shown at 18, is connected between terminal 6 and lead 4 and serves to prevent the emergency storage battery from discharging into the main circuit terminals 6, 7, in case of main power failure to the latter.

Advantageously, in order to permit use of a thyristor 15 having a low power rating so that the cost of the device is reduced, the coil 21 of a magnetic relay R which controls a minimum voltage contactor 22 which is in open circuit condition when the relay coil 21 is energized and in closed circuit condition when the relay coil 21 is not energized or when the voltage is too low, is connected across the terminals 6, 7, of the main power circuit between points 19 and 20. It is to be noted that point 19 is located between the terminal 6 and the rectifier 18 so that the emergency battery 9 cannot energize the coil 21. Point 19 is upstream of the diode 18.

Moreover, for the purpose of protecting the thyristor 15 against reversal over voltages, e.g. when contactor 22 opens, a protective device of a known type such as the type called a "Klip-Sel" may be parallel connected across the contacts a and b which the contactor 22 bridges in closed circuit position.

The operation of the device which has just been described can be easily deduced from this description.

The switch 24 connected in the circuit of the load apparatus 1 upon being closed connects the main power terminals 6 and 7 to said apparatus and the main power supply then normally delivers a sufficient operating voltage at the terminals 2, 3 of the load circuit 8 to operate said apparatus 1. Meanwhile, the charging set 10 which is supplied, for instance, at 25, 26 from the said main AC power supply terminals $S_1$, $S_2$ maintains the battery 9 in a charged state.

As long as the voltage at the main source terminal 6, 7 is normal, the potential difference $V_p$—$V_c$ is negative, so that thyristor 15 remains turned off. Therefore, the battery 9 does not discharge into the load circuit 8 but delivers only a very low current through the resistor 13, thus keeping in reserve the voltage $V_p$ of the gate P at a value selected by means of the position of the slide 14 on resistor 13.

If the voltage at the main source terminals 6, 7, drops below the selected minimum value e.g. a few volts, so that the potential difference $V_p$—$V_c$ becomes positive, the thyristor 15 will become conductive and the emergency storage battery 9 is substituted for the main source within in a few microseconds in order to supply the load circuit 8 through the closed switch 24.

At such time, the relay coil 21 controlling the position contactor 22 being no longer sufficiently energized, a few dozens of milliseconds later, the contactor 22 will move to close circuit between contacts a and b, short circuiting the thyristor 15 which is then no more traversed by any current and is turned off, while the battery 9 will still supply the load circuit 8 through the closed contacts a and b bridged by contactor 22 in its closed position.

When the voltage at the main source terminals 6, 7, is restored, the relay coil 21 is once more energized and the contactor 22 opens, moving away from contacts a and b. However, at such time, the cathode C potential $C_p$ in the thyristor 15 becoming higher than that $V_p$ of the gate P, the thyristor remains turned off, i.e. non-conductive. Thus, the battery 9 does no longer discharge into the load circuit 8. Moreover, during transition, the thyristor 15 has been effectively protected by the protective device 23 against any untimely transient over-voltage.

It should be noted further that a fuse is provided at 27, in the battery circuit in order to limit the current supplied by it, particularly through the thyristor 15 if any short circuit should have occurred in the load circuit 8 and caused the main source to be cut off.

Figure 2:
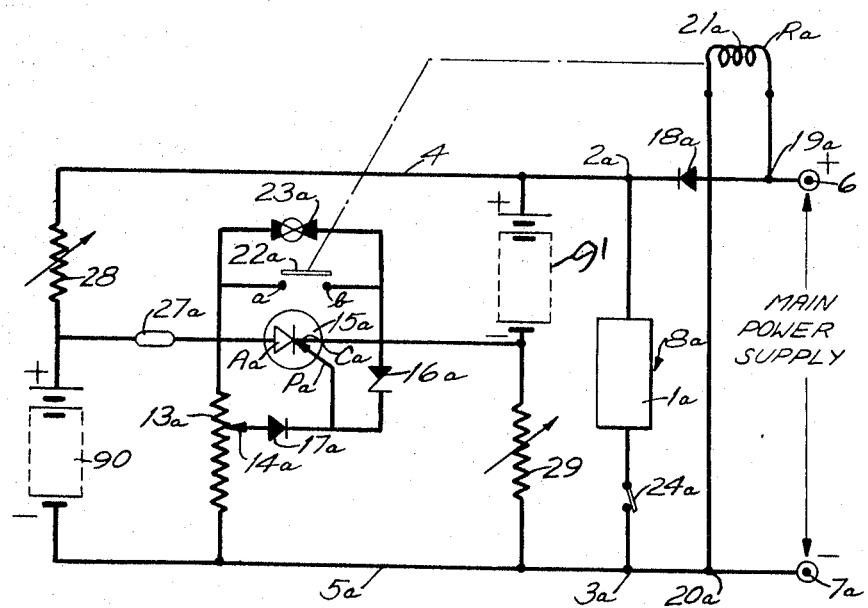
FIGURE 2 is an electrical diagram of a further embodiment of a switching device in accord with the invention.

The embodiment shown in FIGURE 2 is very similar to that shown in FIGURE 1. Thus, the same reference numbers with subscripts have been used to identify the same elements in both figures.

The device shown in FIGURE 2 differs from that of FIGURE 1 in that the emergency storage battery comprises two half-batteries 90 and 91 which are normally charged when parallel connected to the main source terminals 6a, 7a through respective adjustable resistors 28 and 29, but which are series connected for discharging into the apparatus 1a in load circuit 8a in case of failure of the main power plant.

Such an arrangement is advantageous since no particular charging set 10 like that used with the circuit of FIGURE 1 is then necessary.

It should be noted that though the use of a magnetic relay Ra, its operating coil 21a and contactor 22a are advantageous, such a relay and its components are not absolutely necessary provided that the series voltage at the emergency battery terminals be slightly lower than the voltage normally supplied at the main supply circuit terminals 6a and 7a, thus permitting the cut-off and the turn-off of the thyristor 15a as soon as the voltage supplied at the main circuit terminals 6a and 7a exceeds the series voltage at the emergency battery terminals.

This can be reliably obtained when the rated voltage of the series-connected batteries 90 and 91 is not very different from the main source voltage, provided that the said battery voltage steeply decreases during their discharge, which is realized when the discharge rate is higher than the one-hour rate, the capacity of the batteries being selected according to the conditions of utilization.

If the voltage delivered by the series-connected emergency batteries is higher than the voltage delivered by the main source, a sharp turning off of the thyristor 15a can only be obtained with a particular switching device, e.g. a magnetic relay Ra and coil 21a and contactor such as the contactor 22a, but this relay should then be connected as shown in FIGURE 2 which, it will be noted, provides the same connections as for relay of FIGURE 1.

The voltage vs. time curves of FIGURES 3 to 6 clearly show how the switching is obtained.

FIGURE 3 shows the voltage curve plotted against time, at the cut-off of a main supply source delivering an initial voltage of 220 volts. A switching voltage of 170 volts had been selected for the thyristor 15, the slide 14 being set at the corresponding position. In that case, this voltage of 170 volts are still adequate for the operation of the load circuit.

The curve plotted in FIGURE 3 shows in its first part several oscillations around an average value of 220 volts, which correspond to the voltage oscillations of the rectified power supplied by the main source. At the cut-off of the main source, the voltage drops down to about 170 volts then quickly rises again within a few microseconds to 220 volts supplied by the emergency battery 9.

The FIGURE 4 shows the interesting portion of the curve shown in FIGURE 3, with an enlarged time scale as abscissae.

FIGURE 5 shows in the same way how the voltage is restored in the load circuit connected to the main source terminals, when the main power source voltage becomes higher than the battery voltage, stopping the flow of current through the thyristor 15 (supposing in this case that no magnetic contractor 22 is provided). It may be seen that the running off of the thyristor 15 implies no substantial voltage drop.

It must be noted that the various oscillations of the voltage around the average value of 220 volts of the rectifier power as shown in FIGURES 3 to 5 correspond to the various oscillations of a rectified three-phase current supplied by the mains at 6 and 7.

The short switching response time and the sensitivity of the system according to the invention are such that this device can be used to palliate the failure of one phase of a rectified alternating current. The FIGURES 6 and 7 illustrate such a use applied to a rectified three-phase alternating current.

FIGURE 6 shows a diagram of the main source voltage for a rectified three-phase alternating current, a phase of which has failed, when this source alone supplies a load circuit; it may be seen that the voltage falls practically to zero and consequently such a supply would be very hazardous for many kinds of load.

FIGURE 7 shows the diagram of the voltage (curve $C_2$ at the terminals 2, 3, of a load 8, supplied by a voltage as in FIGURE 6, but connected to an emergency battery with a switching device according to the invention. In order to illustrate the advantage of the said switching device, curce $C_1$ of FIGURE 6 has been superimposed in dotted line in curve $C_2$. As soon as the voltage drops to 170 volts (which is the selected value in this case) the switch acts and the battery supplies the load circuit until the voltage of the following alternation rises to exceed the voltage of the emergency battery which is immediately cut off, and the voltage rises up to the curve $C_1$'s consecutive crest; then the same process begins again at the following cycle.

While specific embodiments of the invention have been shown and described, variations within the scope of the appended claims are possible and are contemplated. There is no intention of limitation to the exact disclosure herein presented.

What is claimed is:

1. An arrangement for suplying a load apparatus requiring substantially continuous uni-directional current in a load circuit from an operative main power supply only and from an emergency power supply only upon operative failure of the main power supply comprising a superfast static switching device having a very short period of response time including an electronic device having a control electrode, an anode and a cathode, said switching device being of controlled conduction type and entirely non-conductive during normal operative condition of the main power supply and being rendered fully conductive upon occurrence of failure of said main power supply, said anode being connected directly to a positive terminal of said emergency power supply, said cathode being connected to a positive terminal of said main power supply, means connecting said control electrode to receive a selected fraction of the voltage across said emergency power supply so that normally during operative condition of said main power supply said switching device is entirely non-conductive, said cathode being responsive to voltage at the positive terminal of the main power supply so that upon failure of the main power supply the selected voltage fraction at said control electrode renders said switching device conductive when differences between said voltage fraction and said voltage at main power terminal become positive thereby then only permitting current from the emergency power supply to supply operative power via the anode and cathode of said switching device to the load apparatus in said load current, and shunting means operative subsequent to establishing of conductive condition of said switching device to by-pass said switching device and continue to permit supply of current from said emergency power supply only to said load circuit for the duration of failure of said main power supply.

2. An arrangement according to claim 1, including a potentiometer resistor connected across both terminals of said emergency power supply and a potentiometer slide movable along said resistor and connected to said control electrode to provide said selected voltage fraction.

3. An arrangement according to claim 2 including a one-way current transmitter interposed between said potentiometer slide and said control electrode to permit flow of current only in one direction from the slide to said control electrode.

4. An arrangement according to claim 1, including a one-way current transmitter connected between said positive terminal of said main power supply and said cathode to prevent discharge of said emergency power supply into said main power supply whenever said emergency power supply is supplying power to said apparatus in said load circuit.

5. An arrangement according to claim 1, wherein said shunting means includes a relay switch whose movable bridging contact is maintained in open circuit position relative to a pair of fixed contacts while said main power supply is fully operative and supplies said load apparatus in said load circuit with operating power, said movable contact being movable into closed circuit condition across said pair of contacts to shunt said switching device when voltage across the terminals of said main power supply falls below a selected value and permit flow of current from said emergency power supply via said movable contact to the apparatus in said load circuit.

6. The arrangement according to claim 5, including a one-way current transmitter connected between a terminal of said main power supply and said switching device to prevent discharge of power from said emergency supply into said main power supply during operative failure of the latter, said relay having its operating coil connected across the terminals of said main power supply upstream of said one-way current transmitter.

7. An arrangement according to claim 1, including safety protective means connected in parallel with said cathode and control electrode to prevent potential difference between said control electrode and said cathode from increasing above the breakdown voltage of said static switching device.

8. An arrangement according to claim 7, wherein said safety protective means is a Zener diode.

9. An arrangement according to claim 5, including a protective device parallelly connected across said pair of fixed contacts.

10. An arrangement according to claim 9 wherein said protective device is a "Klip-Sel."

11. An arrangement according to claim 1, wherein said emergency power supply is a battery and said main power supply provides uni-directional current.

12. An arrangement according to claim 11, wherein said battery is subdivided into a pair of series connected half batteries and circuit means for connecting said half batteries in parallel to said main power supply for charging therefrom, and wherein the series connected half batteries are connected through said switching device to supply power to the load circuit apparatus on failure of said main power supply.

13. An arrangement according to claim 12, wherein said circuit means includes regulating means to control the charging of said half batteries from said main power supply.

14. An arrangement according to claim 1, wherein said switching device is a thyristor.

References Cited

UNITED STATES PATENTS 3,040,182   6/1962   Lapuyade _____ 307—66
3,240,949   3/1966   Balkow et al. _____ 307—66

ROBERT K. SCHAEFER, *Primary Examiner.*

H. J. HOHAUSER, *Assistant Examiner.*